(12) United States Patent
Watson

(10) Patent No.: US 11,832,607 B2
(45) Date of Patent: Dec. 5, 2023

(54) SHARK REPELLENT

(71) Applicant: Brian Chase Watson, Greenwood Village, CO (US)

(72) Inventor: Brian Chase Watson, Greenwood Village, CO (US)

( * ) Notice: Subject to any disclaimer, the term of this patent is extended or adjusted under 35 U.S.C. 154(b) by 94 days.

(21) Appl. No.: 17/362,881

(22) Filed: Jun. 29, 2021

(65) Prior Publication Data
US 2022/0030848 A1    Feb. 3, 2022

Related U.S. Application Data

(62) Division of application No. 16/944,990, filed on Jul. 31, 2020, now Pat. No. 11,076,590.

(51) Int. Cl.
*A01M 29/24* (2011.01)
*A41D 13/012* (2006.01)
*B63C 9/11* (2006.01)
*A01K 81/04* (2006.01)
*F41B 7/04* (2006.01)

(52) U.S. Cl.
CPC ............. *A01M 29/24* (2013.01); *A01K 81/04* (2013.01); *A41D 13/0125* (2013.01); *B63C 9/11* (2013.01); *F41B 7/043* (2013.01)

(58) Field of Classification Search
CPC ....... A01M 29/24; A41D 13/0125; B63C 9/11
See application file for complete search history.

(56) References Cited

U.S. PATENT DOCUMENTS

| | | | | |
|---|---|---|---|---|
| 2,389,719 A | * | 11/1945 | Dinsley | B63C 9/00 514/557 |
| 3,771,249 A | * | 11/1973 | Johnson | F41B 15/04 473/570 |
| 4,211,980 A | * | 7/1980 | Stowell | A01K 79/02 455/100 |
| 6,606,963 B1 | | 8/2003 | Wynne | |
| 7,302,905 B1 | | 12/2007 | Wynne | |
| 8,691,253 B1 | * | 4/2014 | Tracy | A01N 25/34 428/36.1 |
| 8,951,544 B2 | | 2/2015 | Stroud | |
| 9,084,415 B2 | * | 7/2015 | Stroud | B63B 32/40 |
| 9,108,707 B2 | | 8/2015 | Pradeep | |
| 9,434,455 B2 | | 9/2016 | Stroud | |

(Continued)

FOREIGN PATENT DOCUMENTS

| WO | WO-2016064409 A1 | * | 4/2016 | ............. B63B 32/64 |
|---|---|---|---|---|
| WO | WO2016064409 A1 | | 4/2016 | |

OTHER PUBLICATIONS

SHARKBANZ 2 Magnetic Shark Repellent Band (Amazon ASIN B07C455TCJ) https://www.amazon.com/SHARKBANZ-Magnetic-Shark-Repellent-Marine/dp/B07C455TCJ/ref=redir_mobile_desktop?ie=UTF8&aaxitk=L1cjsx9eHoAlbyQqGKiQkQ&hsa_cr_id=7845106960201&ref_=sbx_be_s_sparkle_td_asin_0&th=1 (last visited on Jan. 30, 2019).

(Continued)

*Primary Examiner* — S. Joseph Morano
*Assistant Examiner* — Jovon E Hayes
(74) *Attorney, Agent, or Firm* — Eric Kelly

(57) ABSTRACT

Some embodiments may be of spearfishing apparatus fitted with at least one magnet configured to repel sharks away from the spearfishing apparatus. The spearfishing apparatus may be one or more of: a spearfishing shaft, a spearfishing tip, and/or a spearfishing gun. Such magnets may be electromagnets powered by batteries in some embodiments.

10 Claims, 14 Drawing Sheets

(56) References Cited

U.S. PATENT DOCUMENTS

| | | | |
|---|---|---|---|
| 9,497,973 B2 | 11/2016 | Stroud | |
| 9,694,881 B1* | 7/2017 | Ellis | B63B 32/64 |
| 9,975,612 B1* | 5/2018 | Ellis | A41D 13/0125 |
| 2007/0163558 A1* | 7/2007 | Riffe | F41B 3/005 |
| | | | 124/22 |
| 2010/0203154 A1 | 8/2010 | Stroud | |
| 2013/0314044 A1* | 11/2013 | Bahadik | H02J 7/1415 |
| | | | 290/1 R |
| 2015/0360759 A1* | 12/2015 | Ashard | G01L 19/00 |
| | | | 141/95 |
| 2016/0016644 A1 | 1/2016 | Stroud | |
| 2017/0013824 A1 | 1/2017 | Jackson | |

OTHER PUBLICATIONS

SHARKDEFENSE Magnet In Proximity to Fishing Hook http://www.sharkdefense.com/ (last visited on Jan. 30, 2019).

Maverick America Bermudian Pole 8mm Spear Magnetic Slip Tip (but not for repelling sharks) (Amazon ASIN B00WTS8NVY) https://www.amazon.com/Maverick-America-Bermudian-Spear-Magnetic/dp/B00WTS8NVY/ref=sr_1_1?dchild=1&keywords=Maverick+America+Bermudian+Pole+8mm+Spear+Magnetic+Slip+Tip&qid=1595879075&sr=8-1 (last visited on Jan. 30, 2019).

Neritic Magnetic Slip Tip (but not for repelling sharks) https://spearfishing-reviews.com/product/neritic-magnetic-slip-tip/ (last visited on Jan. 30, 2019).

Internet (online) article pertaining to various shark repelling products from https://www.surfertoday.com/surfing/the-ultimate-guide-to-shark-repellents and-deterrents (last visited on Jan. 30, 2019).

* cited by examiner

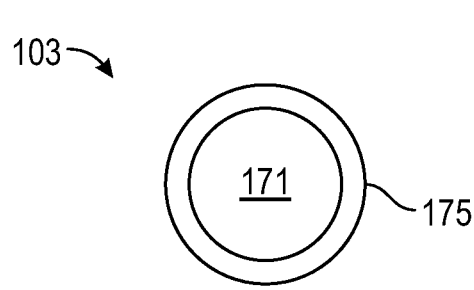
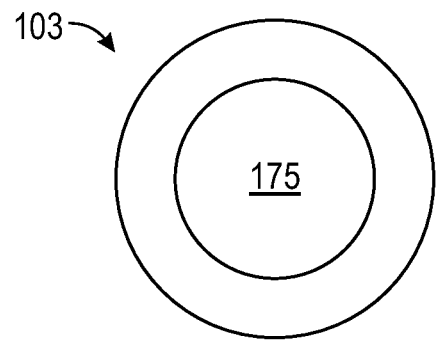
FIG. 1E  FIG. 1F
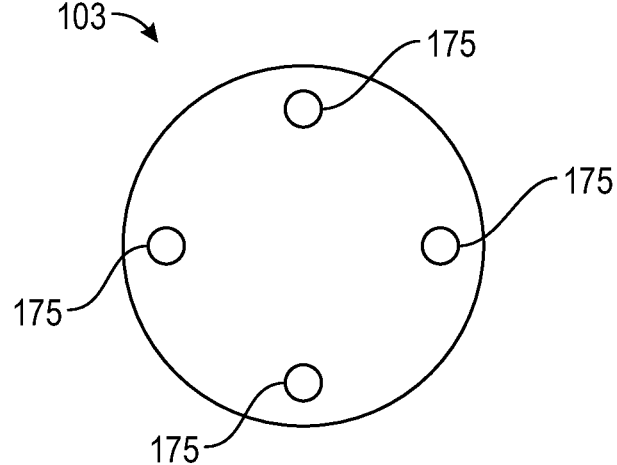
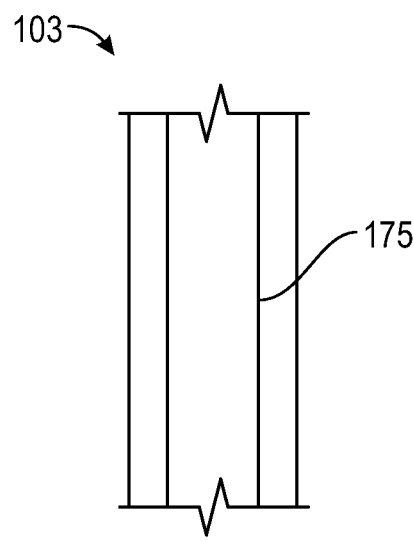
FIG. 1G  FIG. 1H

SHARK REPELLENT

PRIORITY NOTICE

The present patent application is a divisional of U.S. non-provisional patent application, application Ser. No. 16/944,990, filed on Jul. 31, 2020; wherein this present patent application claims priority to application Ser. No. 16/944,990 under 35 U.S.C. § 120. The above-identified parent U.S. non-provisional patent application (application Ser. No. 16/944,990) is incorporated herein by reference in its entirety as if fully set forth below.

TECHNICAL FIELD OF THE INVENTION

The present invention relates in general to repelling sharks, shark repellents, and more specifically to spearfishing shafts and personal floatation devices (PFDs) that may comprise one or more shark repelling means, such as, by emitting a magnetic field.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks (trademarks) referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Most species of sharks are generally harmless and not a nuisance to humans; however, some species of sharks may attack humans and/or may attack a given fish that a person may be hunting/fishing for. For example, when spearfishing, some species of sharks may attack a given speared fish and/or may attack the person who may be spearfishing.

Note, shark attacks are not limited to salt water. Some species of potentially dangerous sharks, such as, bull sharks, may be found in fresh water and/or in brackish water.

It would be desirable if at least some portion of a spearfishing shaft were able to repel sharks, in order to better enable the spearfisher person to retain speared fishes without those speared fishes being attacked by sharks. It would be desirable if at least some portion of a spearfishing shaft were able to repel sharks, in order to provide increased safety to the spearfisher person from shark attacks. It would be desirable if at least some portion of a spearfishing shaft were able to actively emit a magnetic field in order to repel sharks.

Similarly, it would be desirable if at least some portion of a lifejacket or a personal floatation device ("PFD") were able to repel sharks, in order to provide increased safety to a person in the water (and using the given PFD) from shark attacks. It would be desirable if at least some portion of a PFD were able to actively emit a magnetic field in order to repel sharks.

The inventions and embodiments, shown, described, and discussed herein, may be with respect to repelling and/or deterring sharks from attacking/biting humans and from attacking/biting fish that have been speared. That is, the inventions and embodiments, may be with respect to sharks that have a history of attacking/biting humans, such as, but not limited to, tiger sharks, bull sharks, great white sharks, reef sharks, mako sharks, blue sharks, and the like. That is, the inventions and embodiments may be directed to repelling and/or deterring sharks of class Chondrichthyes, subclass Elasmobranchii, orders Carcharhiniformes and Lamniformes, and the like.

There is a need in the art for spearfishing gear that may repel sharks and/or deter sharks from attacking/biting a human holding such spearfishing gear and/or deter sharks from attacking/biting a fish speared with such spearfishing gear.

There is a need in the art for a PFD (personal floatation device) that may repel sharks and/or deter sharks from attacking/biting a person wearing such a PFD.

It is to these ends that the present invention has been developed.

BRIEF SUMMARY OF THE INVENTION

To minimize the limitations in the prior art, and to minimize other limitations that will be apparent upon reading and understanding the present specification, embodiments of the present invention may describe spearfishing shafts, spearfishing tips, spearfishing guns, and/or PFDs (personal floatation devices) having one or more magnets and/or a magnetized material(s) that may emit a magnetic field configured for repelling sharks. Some embodiments may be of spearfishing apparatus fitted with (and/or constructed with) at least one magnet configured to repel sharks away from the spearfishing apparatus. Some embodiments may be of personal floatation devices (PFDs) fitted with (and/or constructed with) at least one magnet configured to repel sharks away from the personal floatation device.

It is an objective of the present invention to provide a spearfishing shaft that may repel sharks.

It is another objective of the present invention to provide a spearfishing shaft and/or a spearfishing tip that may emit a magnetic field.

It is another objective of the present invention to provide a spearfishing shaft and/or a spearfishing tip that may emit a magnetic field that may repel sharks.

It is another objective of the present invention to provide a personal floatation device ("PFD") (e.g., a lifejacket) that may repel sharks.

It is another objective of the present invention to provide a PFD that may emit a magnetic field.

It is yet another objective of the present invention provide a PFD that may emit a magnetic field that may repel sharks.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1E may depict a cross-section through a diameter of a spearfishing shaft (or through a spear tip), showing where at least one magnet may be located.

FIG. 1F may depict a cross-section through a diameter of a spearfishing shaft (or through a spear tip), showing where at least one magnet may be located.

FIG. 1G may depict a cross-section through a diameter of a spearfishing shaft (or through a spear tip), showing where at least one magnet may be located.

FIG. 1H may depict a portion of a given length of spearfishing shaft showing where at least one magnet may be located.

Figure 1A:
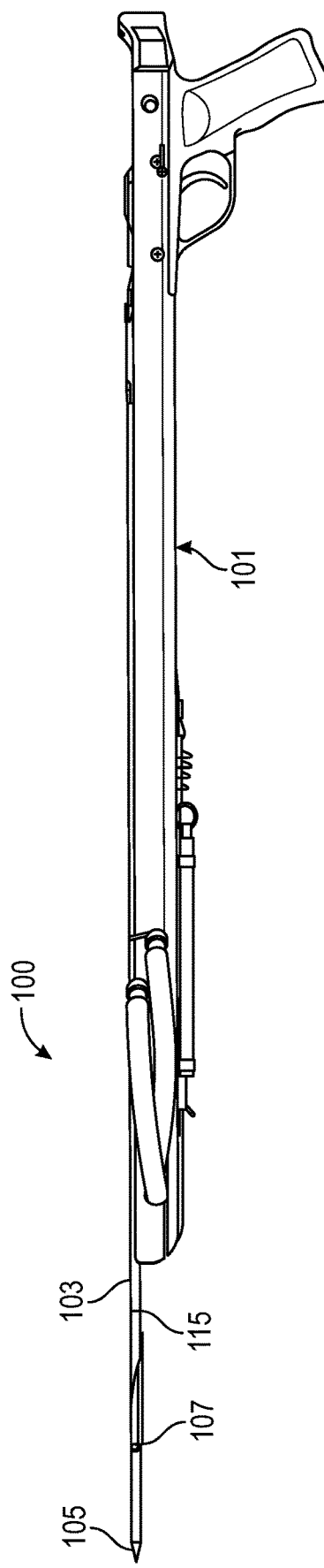
FIG. 1A may depict a longitudinal side view of a spearfishing gun assembly, according to at least one embodiment of the present invention.

REFERENCE NUMERAL SCHEDULE 100 speargun assembly 100
101 speargun 101 (also known as, "gun 101")
103 spearfishing shaft 103 (also known as, "shaft 103")
105 tip 105
107 flopper 107
109 end 109
111 groove 111
113 tab 113
115 tip-attachment-end 115
150 polespear 150
151 elastic-loop 151
171 core 171
175 magnet 175
201 Type I personal flotation device ("PFD") 201
202 Type II PFD 202
203 Type III PFD 203
204 Type IV PFD 204
205 Type V PFD 205
206 Type V PFD 206
211 exterior cover 211
213 strapping 213
215 fastener 215
217 reflector 217
219 loop 219
221 belt 221
223 pull 223
225 compartment 225
231 front panel 231
233 rear panel 233
235 head support 235
237 shoulder region 237
311 interior cover 311
315 floatation means 315
321 magnet 321
401 magnet holder 401
403 tether 403
405 hinge 405
407 attachment means 407

DETAILED DESCRIPTION OF THE INVENTION

Note, the names (terms) assigned to reference numerals shown in the drawings are intended to convey structural and/or functional information of the given component, part, and/or structure.

Note, "PFD" as used herein may refer to "personal flotation device" and/or "life jacket." PFD, personal flotation device, and/or life jacket may be used interchangeably herein.

Note, "fitted with" language as used herein may be replaced with "constructed with" language.

As previously noted, the inventions and embodiments, shown, described, and discussed herein, may be with respect to repelling and/or deterring sharks from attacking/biting humans and also from attacking/biting a fish that may be speared by humans during spearfishing. That is, the inventions and embodiments, may be with respect to sharks that have a history of attacking/biting humans, such as, but not limited to, tiger sharks, bull sharks, great white sharks, reef sharks, mako sharks, blue sharks, and the like. That is, the inventions and embodiments may be directed to repelling and/or deterring sharks of class Chondrichthyes, sub-class Elasmobranchii, orders Carcharhiniformes and Lamniformes, and the like. At least one means of repelling and/or such sharks may be through deployed magnetic field, e.g., via one or more magnets.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A through FIG. 1H may show various spearfishing apparatus that may be fitted with (and/or constructed with) at least one magnet (e.g., magnet 175) that may be configured to repel sharks away from the given spearfishing apparatus element. In some embodiments, the spearfishing apparatus may be selected from one or more of: a speargun assembly 100, a spear gun 101 (gun 101), a spear shaft 103 (shaft 103), a spear tip 105 (tip 105), portions thereof, combinations thereof, and/or the like.

FIG. 1A may depict a longitudinal side view of a spearfishing gun assembly 100, according to at least one embodiment of the present invention. In some embodiments, at least one magnet 175 may be located at one or more of: on a stock of gun 101; attached to the stock of gun 101; within the stock of gun 101; at least partially embedded in the stock of gun 101; on a grip of gun 101; attached to the grip of gun 101; within the grip of gun 101; or at least partially embedded in the grip of gun 101; portions thereof; combinations thereof; and/or the like. See e.g., FIG. 1A.

Figure 1B:
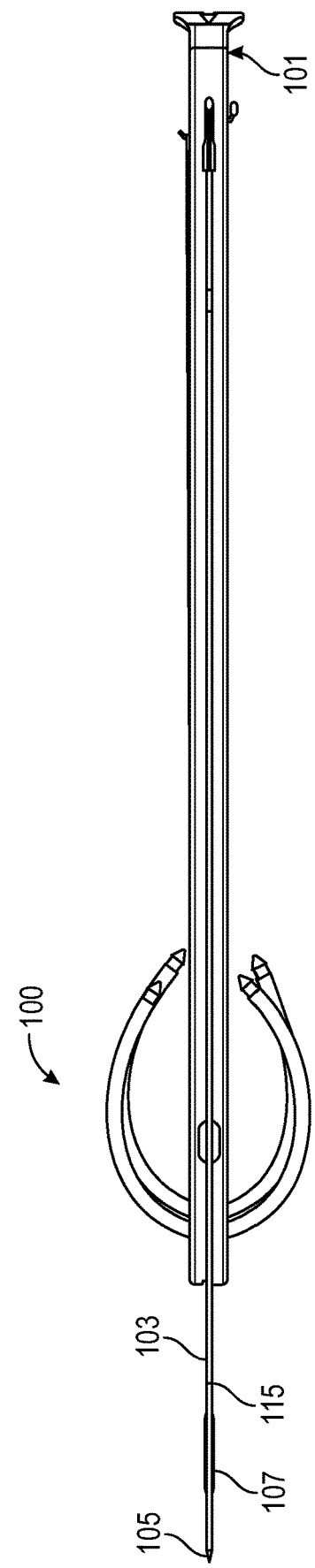
FIG. 1B may depict a longitudinal top view of a spearfishing gun assembly, according to at least one embodiment of the present invention.
Figure 1C:
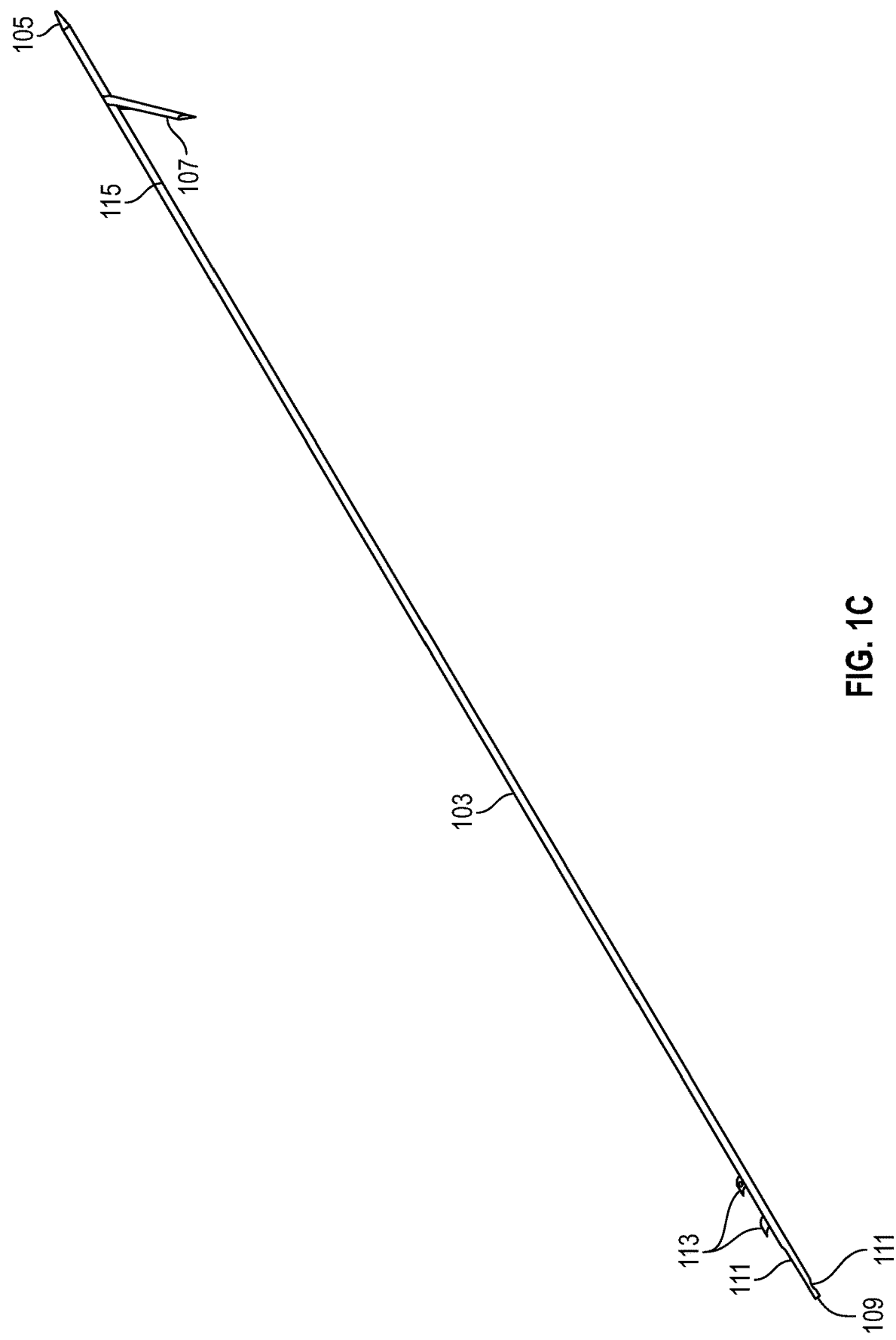
FIG. 1C may depict a longitudinal side view of a spearfishing shaft with tip, according to at least one embodiment of the present invention.

FIG. 1B may depict a longitudinal top view of spearfishing gun assembly 100. FIG. 1C may depict a longitudinal side view of a spearfishing shaft 103 with tip 105, according to at least one embodiment of the present invention. In some embodiments, spearfishing gun assembly 100 may comprise a spearfishing gun 101 (gun 101) and a spearfishing shaft 103 (shaft 103). In some embodiments, shaft 103 may be removably fitted to a stock of gun 101 and with proper use, gun 101 may shoot (fire) shaft 103 from gun 101. In some embodiments, gun 101 may be powered pneumatically (e.g., with compressed gas) and/or with one or more elastic bands/loops (often called "power band(s)).

Discussing FIG. 1C, in some embodiments, shaft 103 may be an elongate-member. In some embodiments, shaft 103 may be substantially (mostly) elongate. In some embodiments, shaft 103 may be cylindrical. In some embodiments, shaft 103 may be substantially (mostly) cylindrical. In some embodiments, at least a portion of shaft 103 may be hollow. In some embodiments, shaft 103 may be substantially comprised of (made of): steel, stainless steel, spring steel, hardened steel, aluminum, graphite, carbon fiber, plastic, ferrous materials, materials capable of being magnetized, magnets, combinations thereof, and/or the like. In some embodiments, shaft 103 may have two opposing terminal ends. In some embodiments, these two opposing terminal ends may be denoted as end 109 and tip-attachment-end 115. In some embodiments, shaft 103 may comprise spearfishing tip 105 (tip 105). In some embodiments, tip 105 may have sharp and/or pointed tip end configured for piercing and/or puncturing at least a portion of a given target prey (such as, but not limited, to some type of fish). In some embodiments, tip 105 may comprise one or more barbs, configured to minimize unintended slippage of tip 105 from the pierced/punctured target prey. In some embodiments, tip 105 may comprise one or more flopper(s) 107, wherein such a flopper 107 may function as a barb. In some embodiments, shaft 103 may terminate at one of its terminal ends into tip 105. In some embodiments, tip-attachment-end 115 may be attached to tip 105. In some embodiments, tip-attachment-end 115 may be removably attached to tip 105. In some embodiments, tip-attachment-end 115 may be removably attached to tip 105 via a threaded connection. In some embodiments, tip-attachment-end 115 may be removably attached to tip 105 via a magnetic connection. In some embodiments, shaft 103 may comprise one or more groove(s) 111. In some embodiments, groove 111 may be a notch into shaft 103. In some embodiments, a given groove 111 may be configured to removably engage a portion of gun 101 (such as, but not limited to, a portion of the gun's 101 power bands). In some embodiments, shaft 103 may comprise one or more tab(s) 113. In some embodiments, a given tab 113 may be configured to removably engage a portion of gun 101 (such as, but not limited to, a portion of the gun's 101 power bands). In some embodiments, embodiments, tab 113 may be known as a "shark fin tab."

Continuing discussing FIG. 1C, in some embodiments, at least one magnet 175 of a given spearfishing apparatus may be located at one or more of: covering most of shaft 103; covering at least a portion of shaft 103; on shaft 103; attached to shaft 103; within shaft 103; comprising shaft material; at least partially embedded in shaft 103; on a terminal end (e.g., tip-attachment-end 115 and/or end 109) of shaft 103; at a terminal end (e.g., tip-attachment-end 115 and/or end 109) of shaft 103; portions thereof, combinations thereof, and/or the like. See e.g., FIG. 1C.

Figure 1D:
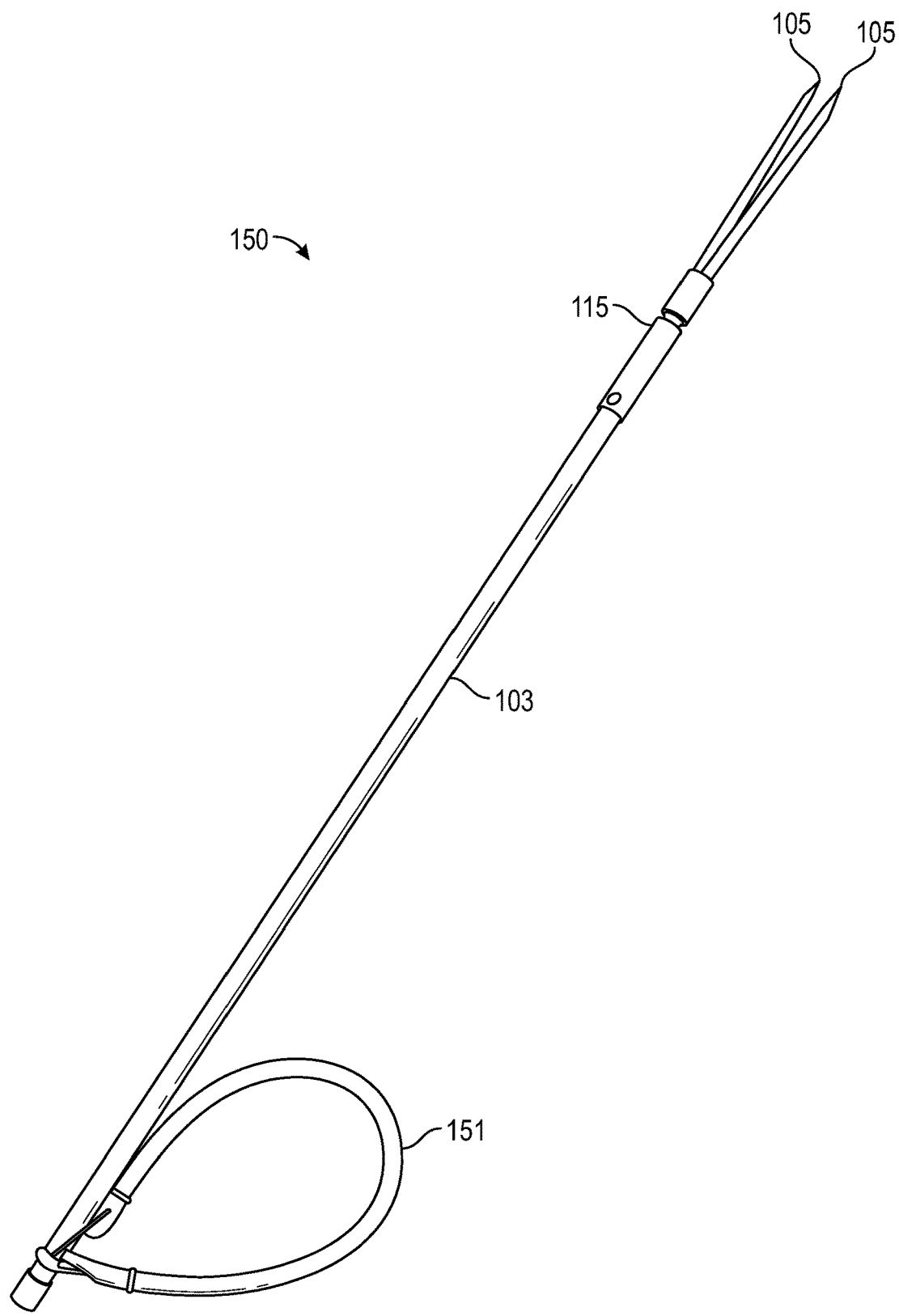
FIG. 1D may depict a longitudinal perspective view of a "polespear" type of spearfishing assembly, according to at least one embodiment of the present invention.

FIG. 1D may depict a longitudinal perspective view of a polespear 150 type of spearfishing assembly, according to at least one embodiment of the present invention. In some embodiments, polespear 150 may not need a gun 101 for proper operation. In some embodiments, polespear 150 may comprise shaft 103. In some embodiments, shaft 103 of polespear 150 may share at least one property with shaft 103 of spearfishing gun assembly 100, except that shaft 103 of polespear 150 may be longer and/or may be have a larger cross-sectional diameter as compared to shaft 103 of spearfishing gun assembly 100. In some embodiments, shaft 103 (of polespear 150) may be an elongate-member. In some embodiments, shaft 103 (of polespear 150) may be substantially (mostly) elongate. In some embodiments, at least a portion of shaft 103 (of polespear 150) may be hollow. In some embodiments, shaft 103 (of polespear 150) may be cylindrical. In some embodiments, shaft 103 (of polespear 150) may be substantially (mostly) cylindrical. In some embodiments, shaft 103 (of polespear 150) may have two opposing terminal ends. In some embodiments, these two opposing terminal ends may be denoted as end 109 and tip-attachment-end 115. In some embodiments, shaft 103 (of polespear 150) may comprise tip 105. In some embodiments, tip 105 may comprise one or more barbs. In some embodiments, tip 105 may comprise one or more flopper(s) 107, wherein such a flopper 107 may function as a barb. In some embodiments, shaft 103 (of polespear 150) may terminate at one of its terminal ends into tip 105. In some embodiments, tip-attachment-end 115 may be attached to tip 105. In some embodiments, tip-attachment-end 115 may be removably attached to tip 105. In some embodiments, tip-attachment-end 115 may be removably attached to tip 105 via a threaded connection. In some embodiments, tip-attachment-end 115 may be removably attached to tip 105 via a magnetic connection. In some embodiments, proximate to end 109 of shaft 103 (of polespear 150) may comprise an elastic-loop 151 for providing a propulsion means to polespear 150. In some embodiments, proximate to end 109 of shaft 103 (of polespear 150) may be attached to elastic-loop 151. In some embodiments, elastic-loop 151 may be substantially comprised of at least one elastomer.

In some embodiments, at least one magnet 175 may be located at one or more of: covering most of tip 105; on tip 105; attached to tip 105; within tip 105; at least partially embedded in tip 105; on a terminal end of tip 105; at a terminal end of tip 105; portions thereof; combinations thereof; and/or the like. See e.g., FIG. 1C and/or FIG. 1D.

In some embodiments, at least some portion of shaft 103 may be magnetized. In some embodiments, at least some portion of shaft 103 may be one or more magnets. In some embodiments, at least some portion of shaft 103 may have one or more magnets. In some embodiments, at least some interior portion of shaft 103 may be magnetized. In some embodiments, at least some interior portion of shaft 103 may have one or more magnets. In some embodiments, at least a portion of shaft 103 may be comprised of one or more materials that may be magnetized. In some embodiments, at least a portion of shaft 103 may be comprised of one or more ferrous materials that may be magnetized. In some embodiments, at least a portion of shaft 103 may be comprised of one or more electric magnets. In some embodiments, the electric magnets may be powered by one or more batteries. In some embodiments, the batteries may be part of shaft 103 and/or in communication with shaft 103. In some embodiments, at least some portion of shaft 103 may emit a magnetic field. In some embodiments, at least some portion of shaft 103 may emit a magnetic field that is stronger than a comparable non-magnetized spearfishing shaft. In some embodiments, at least some interior portion of shaft 103 may comprise one or more magnets. In some embodiments, at least some interior portion of shaft 103 may hold one or more magnets. In some embodiments, magnetic emissions of shaft 103, and/or its components, may repel sharks. This paragraph may be with respect to shaft 103 of speargun assembly 100 and/or of polespear 150. In some embodiments, components, parts, structures, and/or geometry of shaft 103 that this paragraph may be applicable to, may include at least some portion of shaft 103, tip 105, flopper 107 (barb), end 109, groove 111, tab 113, portions thereof, combinations thereof, and/or the like.

FIG. 1E may depict a cross-section through a diameter of shaft 103 (or through tip 105), showing where at least one magnet 175 may be located. In some embodiments, at least one magnet 175, of shaft 103, may be an annular ring and/or an annular sheath that may be substantially surround an elongate shaft core 171 of shaft 103. In some embodiments, shaft core 171 may be an elongate and substantially cylindrical member. In some embodiments, shaft core 171 may provide at least some structural strength and/or rigidity to shaft 103. In some embodiments, shaft core 171 may be substantially comprised of (made of): steel, stainless steel, spring steel, hardened steel, aluminum, graphite, carbon fiber, plastic, ferrous materials, materials capable of being magnetized, magnets, combinations thereof, and/or the like. In some embodiments, with respect to a radial center of shaft 103, shaft core 171 may be located disposed surrounding this radial center. In some embodiments, at least portions of at least one magnet 175 and at least portions of shaft core 171 may be concentric with respect to each other. In some embodiments, at least portions of at least one magnet 175 and at least portions of shaft core 171 may be coaxial with respect to each other. In some embodiments, at least one magnet 175 may completely surround shaft core 171. In some embodiments, at least one magnet 175 may surround substantially all of shaft core 171. In some embodiments, at least one magnet 175 may surround most of shaft core 171. In some embodiments, at least one magnet 175 may surround a majority of shaft core 171. In some embodiments, at least one magnet 175 may surround at least a portion of shaft core 171. In some embodiments, at least one magnet 175 may be one or more annular rings of magnets that may surround portions of shaft core 171. In some embodiments, at least one magnet 175 together with shaft core 171 may form shaft 103. In some embodiments, the shaft core 171 may be constructed of magnetized materials. In some embodiments, shaft core 171 may comprise one or more batteries configured for electrically powering at least one magnet 175 and/or other magnet(s), when at least one of those magnets are an electromagnet. In some embodiments, shaft 103 may comprise at least one magnet 175 and a shaft core 171. In some embodiments, both at least one magnet 175 and shaft core 171 may be elongate cylindrical members. In some embodiments, at least one magnet 175 and shaft core 171 may be substantially concentric with respect to each other over a majority of a length of shaft 103. See e.g., FIG. 1E.

In some embodiments, reference numeral 103 in FIG. 1E may be replaced with reference numeral 105, and then the above discussion of FIG. 1E may be applicable to a cross-section through tip 105.

FIG. 1F may depict a cross-section through a diameter of shaft 103 (or through tip 105), showing where at least one magnet 175 may be located. In some embodiments, at least one magnet 175 may form at least a portion of a core of shaft 103. In some embodiments, at least one magnet 175 may form a core of shaft 103. In some embodiments, at least one magnet 175 may be one or more elongate members. In some embodiments, at least one magnet 175 may be one or more cylindrical members. In some embodiments, with respect to a radial center of shaft 103, at least one magnet 175 may be located disposed surrounding this radial center. In some embodiments, at least portions of shaft 103 and at least portions of at least one magnet 175 may be concentric with respect to each other. In some embodiments, at least portions of shaft 103 and at least portions of at least one magnet 175 may be coaxial with respect to each other. In some embodiments, shaft 103 may completely surround at least one magnet 175. In some embodiments, shaft 103 may surround substantially all of at least one magnet 175. In some embodiments, shaft 103 may surround most of at least one magnet 175. In some embodiments, shaft 103 may surround a majority of at least one magnet 175. In some embodiments, shaft 103 may surround at least a portion of at least one magnet 175. In some embodiments, shaft 103 may be one or more annular rings that may surround portions of at least one magnet 175. In some embodiments, at least one magnet 175 may be substantially an elongate cylindrical member that may form a core of shaft 103, with at least one magnet 175 substantially occupying an axial center of shaft 103. See e.g., FIG. 1F.

In some embodiments, reference numeral 103 in FIG. 1F may be replaced with reference numeral 105, and then the above discussion of FIG. 1F may be applicable to a cross-section through tip 105.

FIG. 1G may depict a cross-section through a diameter of shaft 103 (or through tip 105), showing where a plurality of magnets 175 may be located. In some embodiments, shaft 103 may comprise a plurality of magnets 175. In some embodiments, at least some of the plurality of magnets 175 may run longitudinally within shaft 103. In some embodiments, with respect to a cross-section through a diameter of shaft 103, the at least some of the plurality of magnets 175 may be evenly dispersed/disposed within shaft 103. In some embodiments, the at least some of the plurality of magnets 175 may be one or more elongate members. In some embodiments, the at least some of the plurality of magnets 175 may be one or more cylindrical members. In some embodiments, at least one magnet 175 may be a plurality of magnets 175 that may be dispersed substantially equidistant from each other within shaft 103. See e.g., FIG. 1G.

In some embodiments, reference numeral 103 in FIG. 1G may be replaced with reference numeral 105, and then the above discussion of FIG. 1G may be applicable to a cross-section through tip 105.

FIG. 1H may depict a portion of a given length of shaft 103 (or of a given length of tip 105) showing where at least one magnet 175 may be located. In some embodiments, at least one magnet 175 may be an elongate member. In some embodiments, a length of at least one magnet 175 may be substantially parallel with a length of shaft 103. Note, at least one magnet 175 shown in FIG. 1H may be located on an exterior of shaft 103 and/or within an interior of shaft 103; that is, in some embodiments, FIG. 1H may be of an exterior view of a given portion of shaft 103; whereas, in other embodiments, FIG. 1H may be of a lengthwise cross-section through a portion of shaft 103. In some embodiments, at least one magnet 175 and shaft 103 may be both elongate members that are substantially parallel with each other with respects to lengths of at least one magnet 175 and of shaft 103. See e.g., FIG. 1H.

In some embodiments, reference numeral 103 in FIG. 1H may be replaced with reference numeral 105, and then the above discussion of FIG. 1H may be applicable to a given length of tip 105.

In some embodiments, the given speargun assembly 100 may comprise a means for retrieving a fired/shot shaft 103, comprising a form of tether that is attached to both the gun 101 and to the shaft 103, in some embodiments, a reel to house at least a portion of the tether when not deployed. In such embodiments, the gun 101 may comprise one or more batteries (e.g., in and/or the stock and/or in or on the grip/handle); and the tether may be configured to transmit electrical power from the one or more batteries to one or more electromagnets 175 of the shaft 103.

In some embodiments, at least one magnet 175 may be an electromagnet 175. In some embodiments, the spearfishing apparatus may comprise at least one battery configured to provide electrical power to electromagnet 175. In some embodiments, electromagnet 175 and the at least one battery may be operatively linked with each other.

Note, in some embodiments the above discussed magnet(s) (e.g., magnet(s) 175) used in and/or on the various spearfishing apparatus elements for repelling sharks, are not intended to be used in a magnet's typical attractive applications.

However, in some embodiments, a magnet's attractive uses may be a secondary ancillary/collateral function of the magnet(s) (e.g., magnet(s) 175) used for repelling sharks associated with the various spearfishing apparatus elements.

The PFDs shown, described, and discussed herein (see e.g., FIG. 2A through FIG. 5) may be configured to minimize unintentional submerging of a face of a wearer of the given PFD, when the wearer is properly wearing the given PFD, and both the wearer and that PFD are within some water.

In FIG. 2A through FIG. 5, a given PFD may be fitted with (and/or constructed with) at least one magnet 321 that may be configured to repel sharks away from that given PFD.

Figure 2A:
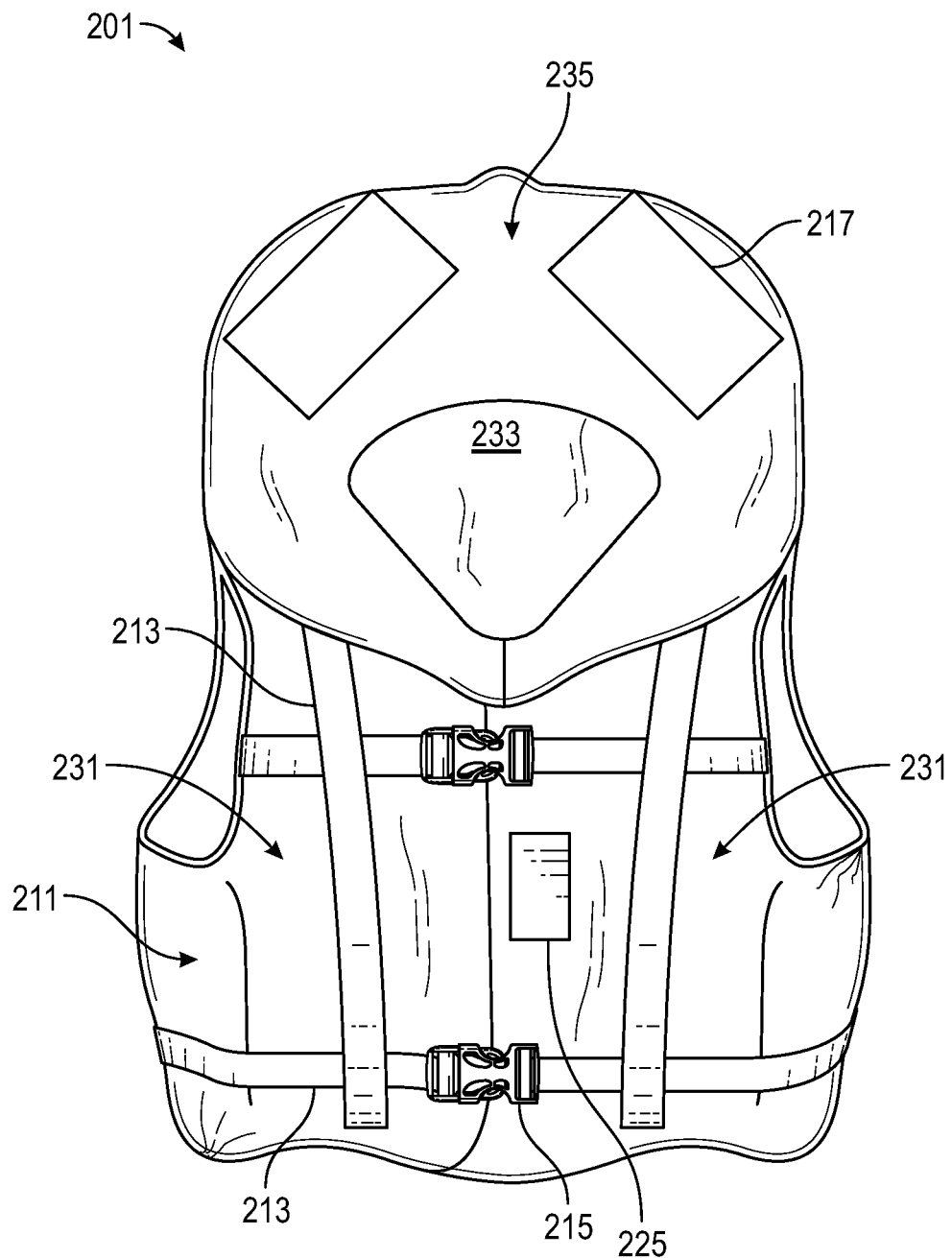
FIG. 2A may depict a front view of a Type I personal floatation device ("PFD"), according to at least one embodiment of the present invention.
Figure 2B:
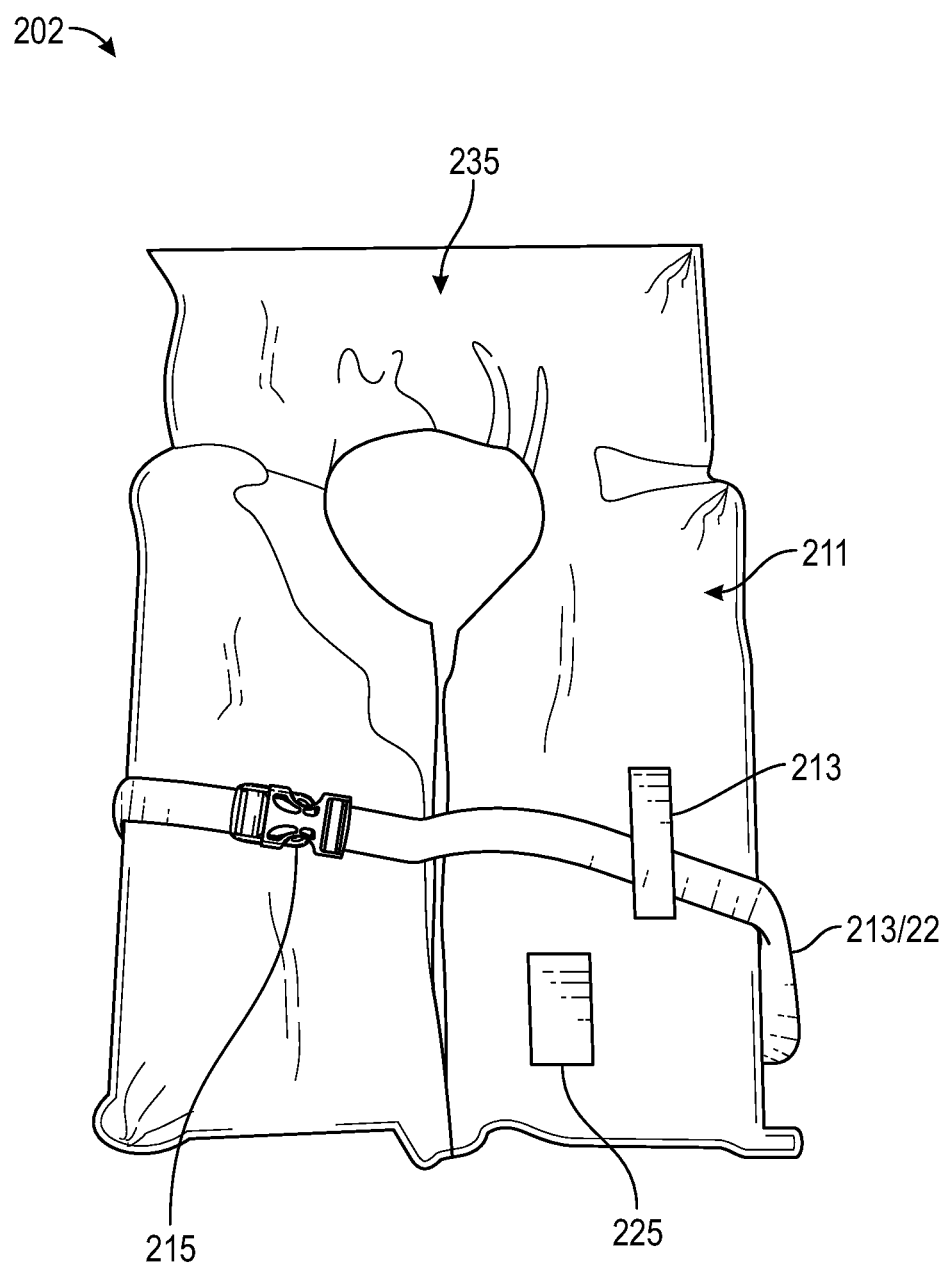
FIG. 2B may depict a front view of a Type II PFD, according to at least one embodiment of the present invention.
Figure 2C:
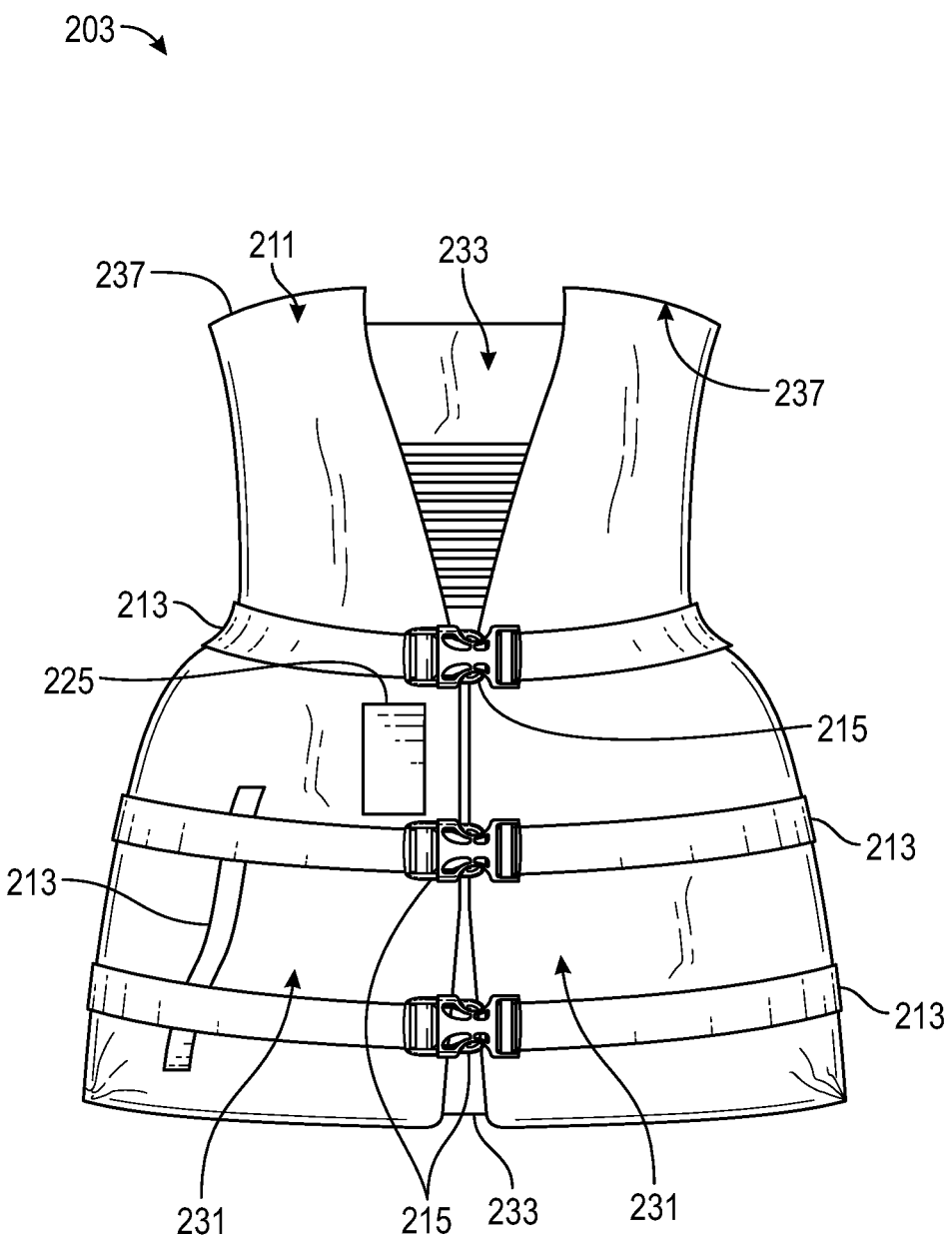
FIG. 2C may depict a front view of a Type III PFD, according to at least one embodiment of the present invention.
Figure 2D:
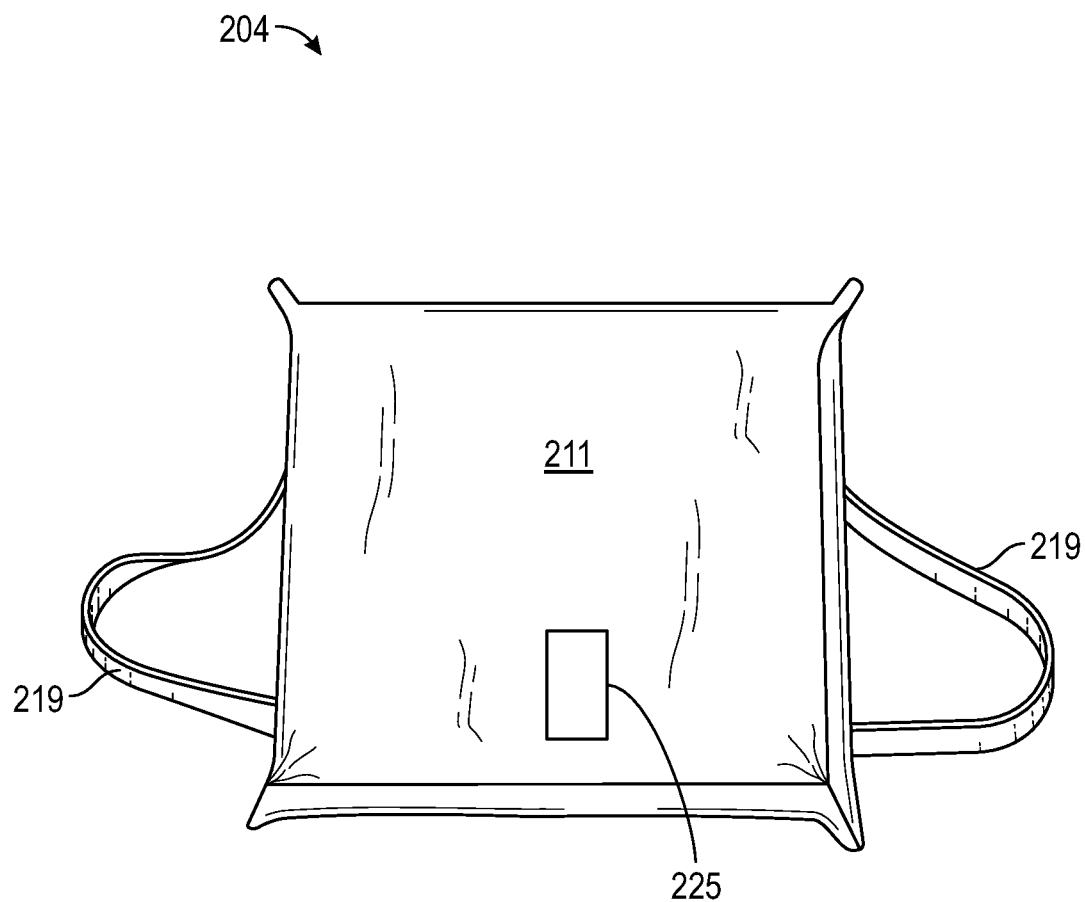
FIG. 2D may depict a front view of a Type IV PFD, according to at least one embodiment of the present invention.
Figure 2E:
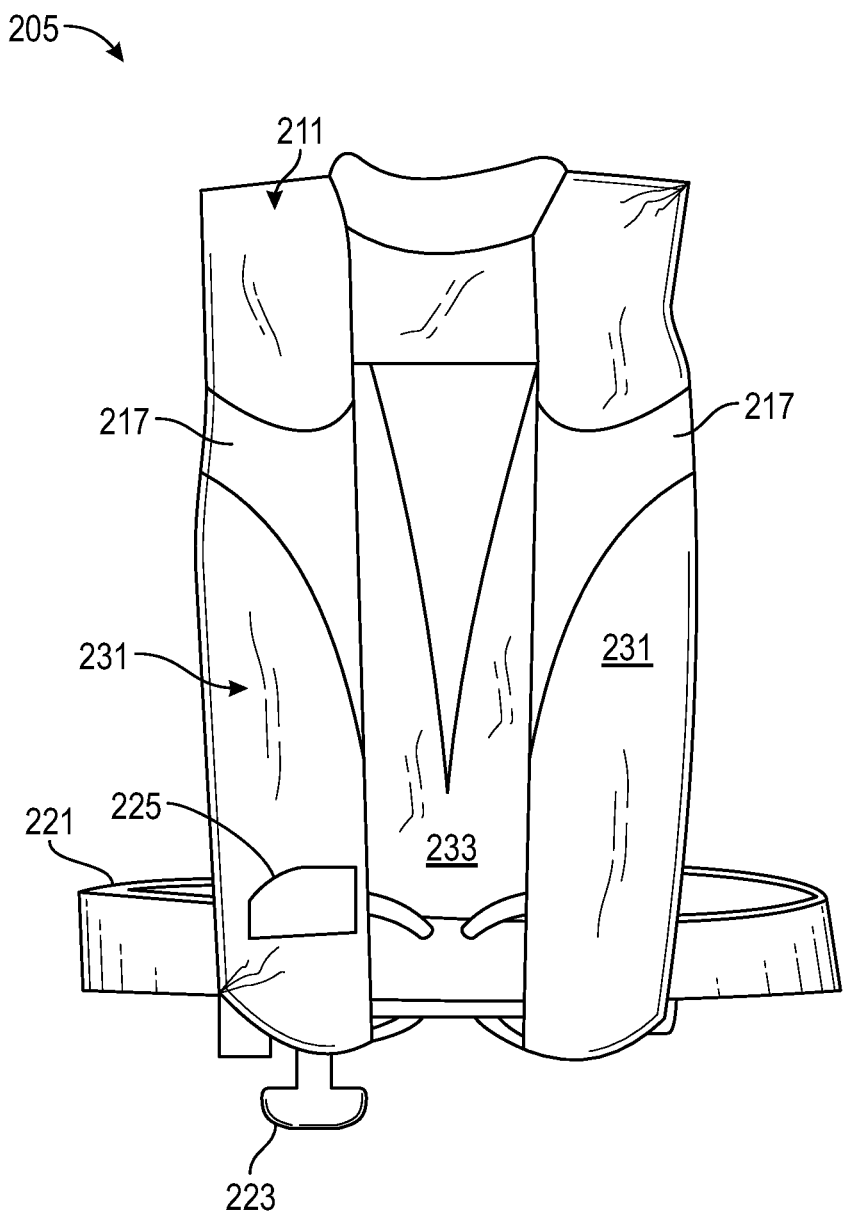
FIG. 2E may depict a front view of a Type V PFD, according to at least one embodiment of the present invention.
Figure 2F:
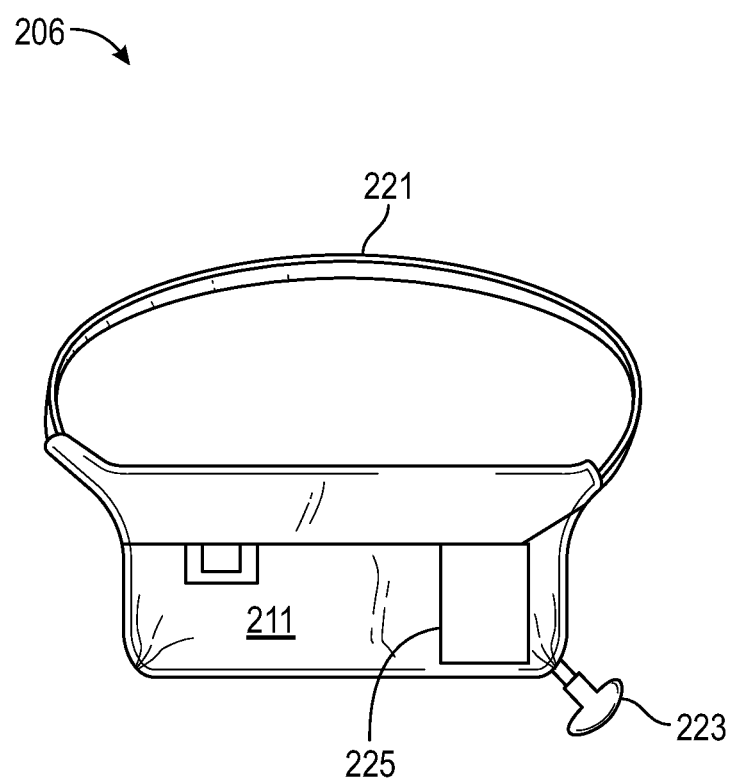
FIG. 2F may depict a front view of another Type V PFD, according to at least one embodiment of the present invention.

FIG. 2A may depict a front view of a Type I PFD ("personal floatation device") 201, according to at least one embodiment of the present invention. FIG. 2B may depict a front view of a Type II PFD 202, according to at least one embodiment of the present invention. FIG. 2C may depict a front view of a Type III PFD 203, according to at least one embodiment of the present invention. FIG. 2D may depict a front view of a Type IV PFD 204, according to at least one embodiment of the present invention. FIG. 2E may depict a front view of a Type V PFD 205, according to at least one embodiment of the present invention. FIG. 2F may depict a front view of a Type V PFD 206, according to at least one embodiment of the present invention. Note, Types I, II, III, IV, and V PFDs may be as substantially defined by the U.S. Coast Guard.

Most PFDs comprise one or more floatation elements (see e.g., floatation means 315 in FIG. 3) that are surrounded by some form of exterior covering, such as exterior cover 211. That is, each of the PFDs shown in FIG. 2A through FIG. 2F comprises one or more interior floatation elements; however, because these are interior elements, these one or more interior floatation elements are not explicitly shown in FIG. 2A through FIG. 2F; whereas, at least portions of exterior cover 211 are shown. Exterior cover 211 is often some form of fabric, synthetic and/or natural. Exterior cover 211 may be substantially waterproof (or not). Exterior cover 211 may be substantially windproof (or not). Portions of exterior cover 211 are often brightly colored (such as, but not limited to, bright reds, oranges, yellows, greens, combinations thereof, and/or the like) to aid in rescue operations and/or to prevent unintended water-craft collisions. The one or more floatation elements are generally some form of foam and/or a substantially non-gas permeable bladder that may be filled with some gas (such as, but not limited to, air, nitrogen, carbon dioxide, combinations thereof, and/or the like). The foam and/or bladders may be sealed and/or divided into one or more panels and/or compartments (often within exterior cover 211). The foam and/or bladders (when filled with the gas) may provide additional buoyancy to a person in water above the buoyancy of the person without such a PFD. For example, and without limiting the scope of the present invention, foam may be the main buoyancy means in figures FIG. 2A through FIG. 2D; whereas, a compressed gas cylinder may be used to inflate substantially non-gas permeable bladder(s) in the PFDs shown in FIG. 2E and FIG. 2F.

Often PFDs may be shaped as some form of a garment, such as, but not limited to, a vest, a fanny pack, a belt, combinations thereof, and/or the like. See e.g., FIG. 2A, FIG. 2B, FIG. 2C, FIG. 2E, and FIG. 2F. Vest like PFDs often have two front panels 231 (e.g., left and right sides) and at least one rear panel 233. In some PFD vests, front panels 231 may cover over at least a portion of a front torso (e.g., chest and/or abdomen) region of the wearer. In some PFD vests, rear panel 233 may cover over at least a portion of a back torso region of the wearer. Front panels 231 and/or rear panel 233 may comprise interior flotation means 315 (i.e., foam and/or gas bladders) that are covered over by exterior cover 211 and by interior cover 311 (see FIG. 3 for interior flotation means 315 and for interior cover 311). The two front panels are often removably attachable to each other (e.g., along a front middle) by one or more fasteners (such as, but not limited to, fastener(s) 215, which may be zippers and/or side release buckles or the like). In some PFD vests, shoulder region 237 may cover over the shoulder regions of the wearer. In some PFD vests, shoulder region 237 may also be used as handles for another to grab a person wearing the PFD and assisting that person with exiting water. In some PFD vests, shoulder region 237 may be another section of foam/buoyancy covered by exterior cover 211 or may be merely straps or strapping 213. A given front panel 231 may be attached to rear panel 233 via at least one shared shoulder region 237. A given front panel 231 may be also be attached to rear panel 233 via some side panel and/or some side straps/side strapping. Some vest like PFDs may also have head and/or neck pillows (head support 235), designed to (configured to) keep an unconscious person's face out of water. See e.g., head support 235 in FIG. 2A and FIG. 2B.

On exterior cover 211 many PFDs may have one or more straps and/or strapping 213. See e.g., FIG. 2A, FIG. 2B, and FIG. 2C. Strapping 213 may also be commonly known as webbing. Strapping 213 is often a flexible, planar, ribbon like, elongate member, that may be braided and/or woven, and often of a synthetic fabric, such as, but not limited to, nylons, poly-esters, and/or the like. Strapping 213 is often attached to exterior cover 211. Strapping 213 is often sewn onto exterior cover 211. Some strapping 213 may terminate in various fastener(s) 215 (such as, but not limited to, side release buckles). Strapping 213 and fasteners 215 may be used to removably attach the given PFD to the given person. Strapping 213 and fasteners 215 may be used to removably tighten the given PFD to the given person. Fasteners 215 may comprise side release buckles, buckles, zippers, snaps, ties, carabiners, Velcro (e.g., a section of loops and a complimentary section of hooks for removable attachment to the section of loops), combinations thereof, and/or the like.

On exterior cover 211 many PFDs may have one or more patches and/or panels of reflector(s) 217. See e.g., FIG. 2A. Reflector 217 may be substantially shiny and/or reflector on its given exterior portions. Reflector 217 may be configured for reflecting at least some light. Reflector 217 may help in nighttime or otherwise poor visibility rescue operations of a person wearing a given PFD with one or more reflector(s) 217.

Some PFDs exist in two configurations, a seat cushion configuration, that upon need may be converted into a PFD configuration, see e.g., FIG. 2D. Such a seat cushion/PFD may have one or more loop(s) 219 extending from the given PFD that may be used as handles and/or worn by a person's appendage(s). In some embodiments, PFD loop(s) 219 may go around a person's leg(s) and/or a person's arm(s).

Some PFDs may have a belt 221 to help the given PFD be worn by the given person. See e.g., FIG. 2E and FIG. 2F. Some such belts may be of strapping 213.

The two different Type V PFDs shown in FIG. 2E and FIG. 2F, respectively are both inflatable types of PFDs, wherein by one pulling sufficiently hard on handle 223, one may cause release of the included compressed gas into one or more substantially non-gas permeable bladders.

In some embodiments, at least some portion of a given PFD may be magnetized to actively emit a magnetic field to help repel sharks. In some embodiments, a given PFD may comprise one or more magnets for emitting a magnetic field to help repel sharks. In some embodiments, at least one magnetizable material and/or at least one magnet may be located at the following one or more PFD locations: attached exteriorly to exterior cover 211, on exterior cover 211, attached interiorly to exterior cover 211, inside of exterior cover 211, in physical communication with foam, attached to strapping 213, part of strapping 213, part of at least one fastener 215, under at least one reflector 217, in at least one compartment 225, combinations thereof, and/or the like. In some embodiments, the magnetizable material may be ferrous material. In some embodiments, at least some portion of a given PFD may emit a magnetic field that is stronger than a comparable non-magnetized PFD. In some embodiments, magnetic emissions of a given PFD, and/or its components, may repel sharks.

In some embodiments, any magnet disclosed herein may be an electromagnet that may be powered by one or more batteries.

In some embodiments, any battery disclosed herein may be rechargeable. In some embodiments, any battery disclosed herein may be non-rechargeable.

Figure 3:
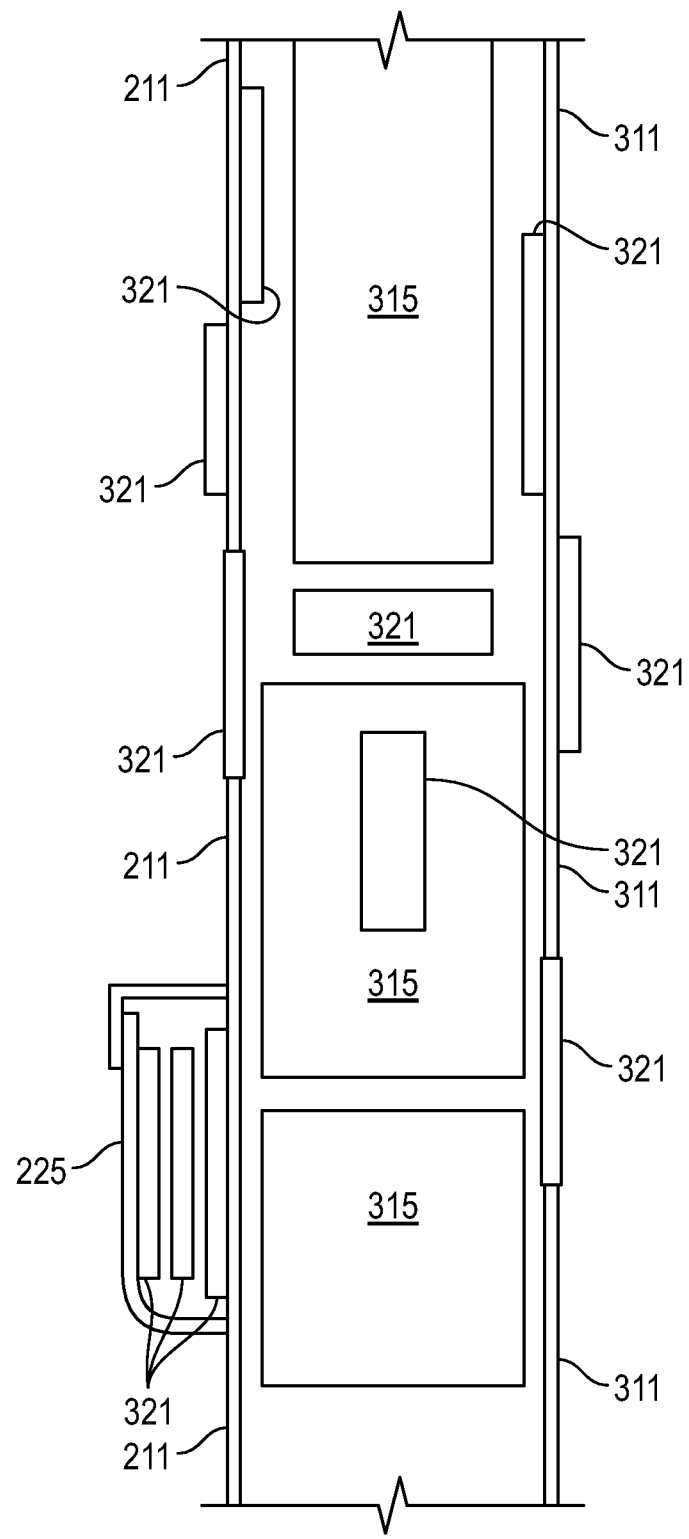
FIG. 3 may depict a cross-section through a portion of PFD panel, showing where at least one magnet may be located.

FIG. 3 may depict a cross-section through a portion of PFD panel, showing where at least one magnet 321 may be located. The portion of PFD panel shown in FIG. 3 may be a portion of a given front panel 231, a portion of a given rear panel 233, a portion of a given head support 235, or a portion of a side panel that connects a given front panel 231 to rear panel 233. The portion of PFD panel shown in FIG. 3 may comprise exterior cover 211 disposed opposite from interior cover 311. When the PFD may be worn, exterior cover 211 may generally face away from the wearer; whereas, interior cover 311 may generally face the wearer. When the PFD may be worn, interior cover 311 may be in physical contact with skin or clothing of the wearer. Disposed between exterior cover 211 and interior cover 311 may be one or more floatation means 315 configured to provide buoyancy to the wearer of the given PFD. One or more floatation means 315 may be selected from foam and/or gas bladder(s). Portions of exterior cover 211 may have one or more: compartments 225, reflectors 217, strapping 213, fasteners 215, loops 219, belts 221, pulls 223, magnets 321, magnetizable materials, combinations thereof, and/or the like. Portions of interior cover 311 may have one or more: compartments 225, reflectors 217, strapping 213, fasteners 215, loops 219, belts 221, pulls 223, magnets 321, magnetizable materials, combinations thereof, and/or the like.

Continuing discussing FIG. 3, in some embodiments, the given PFD panel may comprise at least one magnet 321. In some embodiments, the at least one magnet 321 may be located: on an exterior of exterior cover 211; on an exterior of interior cover 311; attached to exterior cover 211; attached to interior cover 211; embedded at least partially within exterior cover 211; embedded at least partially within interior cover 311; disposed (such as, but not limited to, embedded) between exterior cover 211 and interior cover 311; disposed between floatation means 315; within floatation means 315; on compartment 225; within compartment 225; attached to compartment 225 (e.g., interior or exterior of compartment 225); attached to exterior cover 211 within compartment 211; on strapping 213; attached to strapping 213; on front panel 231; attached to front panel 231; within front panel 231; on rear panel 233; attached to rear panel 233; within rear panel 233; on head support 235; attached to head support 235; within head support 235; on should region 237; attached to shoulder region 237; within shoulder region 237; on loop 219; attached to loop 219; on belt 221; attached to belt 221; portions thereof; combinations thereof; and/or the like.

In some embodiments, at least one magnet 321 of a given PFD may have a predetermined shape, size, thickness, strength, type, combinations thereof, and/or the like. In some embodiments, at least one magnet 321 may be one or more electromagnets. In some embodiments, at least one magnet 321 may have a shape, size, thickness, strength, type, combinations thereof, and/or the like configured to deter and/or rebel sharks from the emitted magnetic field. In some embodiments, at least one magnet 321 of a given PFD may be one or more magnets 321. In some embodiments, at least one magnet 321 of a given PFD may be a plurality of magnets 321.

In some embodiments, one or more batteries, for providing electrical power to at least one magnet 321, may be located: on an exterior of exterior cover 211; on an exterior of interior cover 311; attached to exterior cover 211; attached to interior cover 211; embedded at least partially within exterior cover 211; embedded at least partially within interior cover 311; disposed between exterior cover 211 and interior cover 311; disposed between floatation means 315; within floatation means 315; on compartment 225; within compartment 225; attached to compartment 225 (e.g., interior or exterior of compartment 225); attached to exterior cover 211 within compartment 211; on strapping 213; attached to strapping 213; on front panel 231; attached to front panel 231; within front panel 231; on rear panel 233; attached to rear panel 233; within rear panel 233; on head support 235; attached to head support 235; within head support 235; on should region 237; attached to shoulder region 237; within shoulder region 237; on loop 219; attached to loop 219; on belt 221; attached to belt 221; portions thereof; combinations thereof; and/or the like. For example, in some embodiments, one or more of reference numerals 321 in FIG. 3 are replaced with such a battery; wherein such a battery may be operatively connected to at least one electromagnet 321, via electrical current (that may be switched on or off), to electrically power such an at least one electromagnet 321. In such a circuit that comprises such a battery and at least one electromagnet 321, along with the linking electrical wire(s), may be a switch for turning on or off at least one electromagnet 321.

Figure 4A:
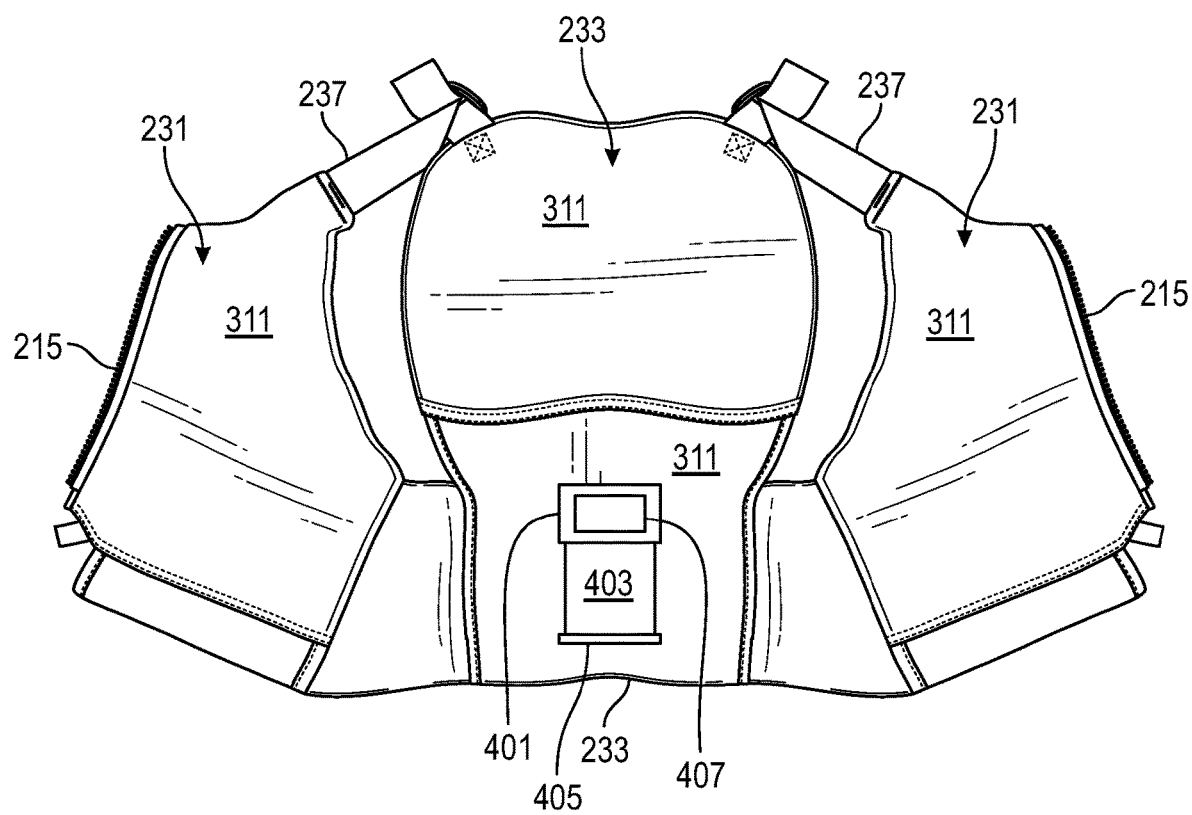
FIG. 4A may depict a given PFD in a state of being unworn and being opened at its front to show an interior of a rear panel that may have a drop-down magnet apparatus affixed therein.

FIG. 4A may depict a given PFD in a state of being unworn and being opened at its front to show an interior (e.g., interior cover 311) of a rear panel 233 that may have a drop-down magnet apparatus affixed therein. In some embodiments, the drop-down magnet apparatus when deployed (see e.g., FIG. 4B for the deployed configuration) may provide a magnet holder 401 (with one or more magnet(s) 321) that may dangle below a majority of the given PFD in the water, via at least one tether 403 that attaches the 401 back to the PFD, such that these dangled magnet(s) 321 may emit a magnetic field in and/or over lower appendages (e.g., legs, thighs, lower legs, ankles, feet, toes, combinations thereof, and/or the like) of the given PFD wearer. This may provide some shark repellent protection to lower body portions of the wearer of the given PFD. In some embodiment, such lowered and dangled magnet(s) 321 may also protect other lower body regions of the wearer, such as, but not limited to, regions at and/or around the pelvis of the wearer.

Continuing discussing FIG. 4A, in some embodiments, a given drop-down magnet apparatus may comprise: at least one magnet holder 401, at least one tether 403, at least one hinge 405, and at least one magnet 321. In some embodiments, at least one magnet 321 may be in physical communication with at least one magnet holder 401. In some embodiments, magnet holder 401 may be a housing, compartment, pocket, container, combinations thereof, and/or the like. In some embodiments, at least one magnet 321 may be: attached to magnet holder 401; within magnet holder 401; on magnet holder 401; at least partially embedded on magnet holder 401; combinations thereof, and/or the like. In some embodiments, magnet holder 401, magnet 321, tether 403; combinations thereof, and/or the like, may be configured to sink in water (including in salt water). In some embodiments, magnet holder 401, magnet 321, tether 403; combinations thereof, and/or the like, may be configured to have substantially neutral buoyancy in water (including in salt water).

Continuing discussing FIG. 4A, in some embodiments, tether 403 may be configured to operate and/or function as a tether/leash, providing a physical link between magnet holder 401 and the given PFD. In some embodiments, tether 401 may have a predetermined length. In some embodiments, tether 401 may have a predetermined length of a range selected from four inches to four feet. In some embodiments, tether 401 may be an elongate member. In some embodiments, tether 401 may be a flexible member. In some embodiments, tether 401 may be an elastic member. In some embodiments, tether 401 may have two opposing terminal ends. In some embodiments, tether 401 may be attached to magnet holder 401 at one of its opposing terminal ends and to the given PFD at its other opposing terminal end. In some embodiments, one terminal end of tether 401 may be attached to rear panel 233. In some embodiments, one terminal end of tether 401 may be attached to a bottom portion of rear panel 233. In some embodiments, one terminal end of tether 401 may be attached to interior cover 311 of rear panel 233. In some embodiments, one terminal end of tether 401 may be attached to strapping 213 of rear panel 233.

Continuing discussing FIG. 4A, in some embodiments, one terminal end of tether 401 may be attached to hinge 405. In some embodiments, hinge 405 may be attached to the given PFD. In some embodiments, hinge 405 may operate/function as an intermediary linkage between tether 403 and the given PFD. In some embodiments, hinge 405 may operate/function as a hinge. In some embodiments, hinge 405 may a living (flexible) hinge. In some embodiments, hinge 405 may be attached to rear panel 233. In some embodiments, hinge 405 may be attached to a bottom portion of rear panel 233. In some embodiments, hinge 405 may be attached to interior cover 311 of rear panel 233. In some embodiments, hinge 405 may be attached to strapping 213 of rear panel 233.

In some embodiments, hinge 405 may be intended to be permanently attached to both tether 403 and to the given PFD.

In some embodiments, hinge 405 may be intended to be removably attached to tether 403 and/or to the given PFD.

Continuing discussing FIG. 4A, in some embodiments, a given drop-down magnet apparatus may further comprise at least one attachment means 407. In some embodiments, attachment means 407 may provide removable attachment of magnet holder 401 to a portion of interior cover 311 of a front panel 231 and/or attachment means 407 may provide removable attachment of magnet holder 401 to a portion of interior cover 311 of rear panel 233. In some embodiments, attachment means 407 may be how the given drop-down magnet apparatus re-mains in the undeployed configuration as shown in FIG. 4A. Whereas, in the deployed configuration (see e.g., FIG. 4B), attachment means 407 is not currently attached to a front panel 231 nor to rear panel 233. In some embodiments, attachment means 407 may be predetermined mechanical fastener, such as, but not limited to, Velcro, Velcro like (e.g., a region of a plurality of hooks and a complimentary region of a plurality of loops, wherein these two regions may removably attach to each other), snaps, buttons, ties, side release buckles, combinations thereof, and/or the like. In some embodiments, a portion of attachment means 407 may be located on an exterior of magnet holder 401. In some embodiments, a portion of attachment means 407 may be attached to a portion of interior cover 311 of rear panel 233; and/or a different portion of attachment means 407 may be attached to a portion of interior cover 311 of a front panel 231.

In some embodiments, a given PFD may comprise at least one drop-down magnet apparatus. In some embodiments, the at least one drop-down magnet apparatus may exist in two operational configurations, a deployed configuration and a non-deployed configuration, respectively. In some embodiments, the at least one drop-down magnet apparatus may comprise at least one magnet holder 401 and at least one tether 403. In some embodiments, at least one magnet holder 401 may be in physical communication with at least one magnet 321. In some embodiments, at least one tether 403 may be in physical communication with both at least one magnet holder 401 and at least one panel (such as, but not limited to, rear panel 233 and/or front panel 231) of the given PFD. In some embodiments, at least one tether 403 may be an elongate flexible member. In some embodiments, in the deployed configuration, at least one magnet holder 401 may be configured to sink below the at least one panel when the given PFD is in the water. In some embodiments, in the non-deployed configuration, at least one magnet holder 401 may be removably attached to the at least one panel via attachment means 407. See e.g., FIG. 4A and FIG. 4B.

Figure 4B:
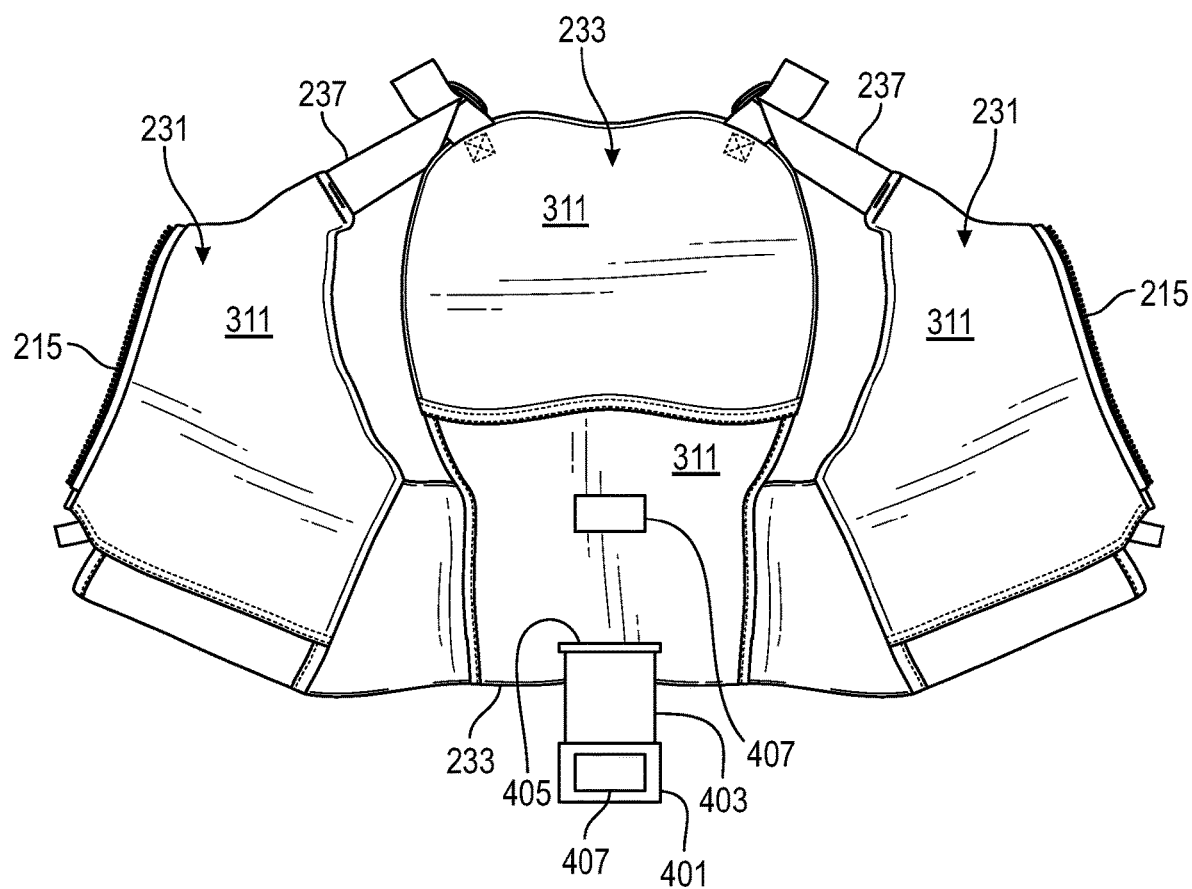
FIG. 4B may depict a given PFD in a state of being unworn and being opened at its front to show an interior of a rear panel that may have a drop-down magnet apparatus deployed.

FIG. 4B may depict a given PFD in a state of being unworn and being opened at its front to show the interior (e.g., interior cover 311) of the rear panel 233 that may have the drop-down magnet apparatus deployed.

Figure 5:
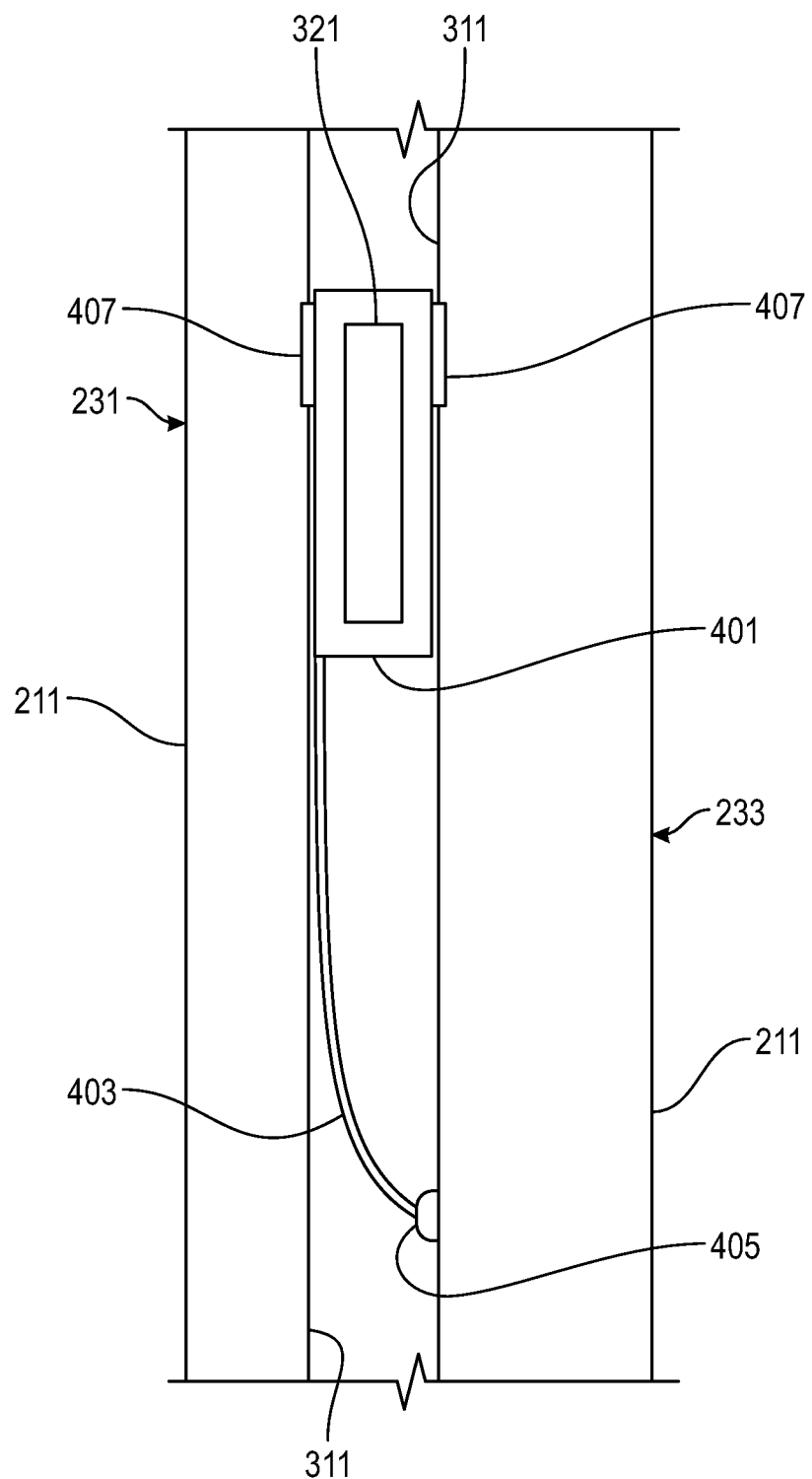
FIG. 5 may depict a cross-section of a given PFD showing before deployment a drop-down magnet apparatus may be disposed between a front panel and a rear panel of the given PFD.

FIG. 5 may depict a cross-section of a portion of a given PFD showing before deployment of where the drop-down magnet apparatus may be disposed between a front panel 231 and rear panel 233 of the given PFD. FIG. 5 may show the drop-down magnet apparatus in its fully undeployed configuration. In some embodiments, when the drop-down magnet apparatus may in its fully undeployed configuration, attachment means 407 may be removably attached to a portion of interior cover 311 of rear panel 233; and/or attachment means 407 may be removably attached to a portion of interior cover 311 of a front panel 231. In the deployed configuration (see e.g., FIG. 4B), attachment means 407 may not currently be attached to a front panel 231 nor to rear panel 233.

In some embodiments, a given PFD may comprise at least one front panel 231 and at least one rear panel 233. In some embodiments, at least one front panel 231 may be configured to cover at least a portion of a front of a torso of the wearer when the wearer is properly wearing the PFD. In some embodiments, at least one front panel 231 may comprise a first floatation means (e.g., floatation means 315) configured to provide buoyancy to the wearer. In some embodiments, this first floatation means may be located substantially inside (within) at least one front panel 231. In some embodiments, at least one rear panel 233 may be configured to cover at least a portion of a back of the torso of the wearer when the wearer is properly wearing the personal floatation device. In some embodiments, at least one rear panel 233 may comprise a second floatation means (e.g., a different floatation means 315) configured to provide buoyancy to the wearer. In some embodiments, this second floatation means may be located substantially inside (within) at least one rear panel 233. In some embodiments, at least one front panel 231 and at least one rear panel 233 may be in physical communication with each other via at least one intermediary linkage (e.g., shoulder region 237 and/or a side panel or side strapping 213). In some embodiments, the at least one intermediary linkage (that may physically link a front panel 231 to a rear panel 233 of a given PFD) may be at least one shoulder region 237. In some embodiments, at least one shoulder region 237 may be configured to cover over a shoulder region of the wearer when the wearer is properly wearing the personal floatation device. In some embodiments, at least one magnet 321 may be attached to the at least one shoulder region 237. See e.g., FIG. 2A, FIG. 2C, FIG. 3, FIG. 4A, FIG. 4B, and/or FIG. 5.

In some embodiments, a given PFD may comprise at least two panels (such as, but not limited to, front panel 231 and rear panel 233). In some embodiments, each of the at least two panels may comprise an exterior covering 211 and an interior covering 311. In some embodiments, exterior covering 211 and interior covering 311 of each of the at least two panels may be mostly disposed opposite from each other. In some embodiments, exterior covering 211 may mostly faces away from a torso of the wearer when the wearer is properly wearing the personal floatation device. In some embodiments, interior covering 311 may mostly face towards the torso of the wearer when the wearer is properly wearing the personal floatation device. In some embodiments, each of the at least two panels may comprise at least one floatation means (e.g., floatation means 315). In some embodiments, the at least one floatation means may be disposed between exterior covering 211 and interior covering 311 of each of the at least two panels. See e.g., FIG. 2A, FIG. 2C, FIG. 3, FIG. 4A, FIG. 4B, and/or FIG. 5. In some embodiments, at least one magnet 321 may be located at one or more of: on exterior covering 211 of at least one of the at least two panels; attached to exterior covering 211 of at least one of the at least two panels; at least partially embedded to exterior covering 211 of at least one of the at least two panels; on interior covering 311 of at least one of the at least two panels; attached to interior covering 311 of at least one of the at least two panels; at least partially embedded to interior covering 311 of at least one of the at least two panels; between exterior covering 211 and interior covering 311 of at least one of the at least two panels; in physical communication with the at least one floatation means of at least one of the at least two panels; portions thereof; combinations thereof; and/or the like. See e.g., FIG. 3.

In some embodiments, at least one magnet 321 may be located at one or more of: on at least one front panel 231; attached to at least one front panel 231; partially embedded in at least one front panel 231; on an exterior covering of at least one front panel 231; on an interior covering of at least one front panel 231; on at least one rear panel 233; attached to at least one rear panel 233; partially embedded in at least one rear panel 233; on an exterior covering of at least one rear panel 233; on an interior covering of at least one rear panel 233; in physical communication with the first floatation means; in physical communication with the second floatation means; portions thereof, combinations thereof; and/or the like. See e.g., FIG. 2A through FIG. 5.

In some embodiments, at least one magnet 321 may be at least one electromagnet. In some embodiments, the given PFD may comprise at least one battery configured to electrically power at least one electromagnet 321. In some embodiments, at least one electromagnet 321 may be operatively linked with the at least one battery.

In some embodiments, a given PFD may comprise at least one compartment 225 located on an exterior covering 211 of the PFD. In some embodiments, at least one compartment 225 may comprise at least one magnet 321. See e.g., FIG. 2A through FIG. 3. In some embodiments, a given PFD may comprise one or more compartment(s) 225. In some embodiments, a given compartment 225 may be an enclosure on and/or of the given PFD. In some embodiments, a given compartment 225 may be substantially sealed closed. In some embodiments, a given compartment 225 may be removably closed (e.g., with a flap and/or a fastener 215). In some embodiments, a given compartment 225 may be a pocket. In some embodiments, a given compartment 225 may comprise one or more articles. In some embodiments, a given compartment 225 may house (hold) the one or more articles. In some embodiments, the one or more articles may be at least one magnetizable material, at least one magnet (e.g., magnet 321), at least one battery (for electrical power). In some embodiments, a given compartment 225 may be located on exterior cover 211. In some embodiments, a given compartment 225 may be located inside of exterior cover 211.

In some embodiments, a system for repelling sharks may comprise at least one PFD fitted with (and/or constructed with) at least one attached magnet 321; and that given PFD may also comprise at least one removable wearable magnet that may be removably attached (and detached) to the given PFD (such as, but not limited to, removably stored within a given compartment 225); wherein during use, the at least one removable wearable magnet may be re-moved from the PFD and then removably worn by the wearer. In some embodiments, the at least one removable wearable magnet may be configured as a bracelet for fitting around a wrist of the wearer. In some embodiments, the at least one removable wearable magnet may be configured as an anklet for fitting around an ankle of the wearer. In some embodiments, the at least one removable wearable magnet may provide protection to extremities/appendages/limbs (such as, but not limited to, hands, feet, arms, legs, and the like) of the wearer. In some embodiments, the at least one attached magnet 321 and/or the at least one removable wearable magnet may be configured to repel sharks.

Note, in some embodiments the above discussed magnet(s) (e.g., magnet(s) 321) used in and/or on the various PFD apparatus elements for repelling sharks, are not intended to be used in a magnet's typical attractive applications.

However, in some embodiments, a magnet's attractive uses may be a secondary ancil-lary/collateral function of the magnet(s) (e.g., magnet(s) 321) used for repelling sharks associated with the various PFD apparatus elements.

In some embodiments, at least one magnet 175, at least one magnet 321, magnets described and/or noted herein, may comprise one or more magnetizable materials. In some embodiments, at least one magnet 175, at least one magnet 321, magnets described and/or noted herein, may comprise one or more materials that are attracted to magnets. In some embodiments, at least one magnet 175, at least one magnet 321, magnets described and/or noted herein, may be at least one permanent magnet. In some embodiments, at least one magnet 175, at least one magnet 321, magnets described and/or noted herein, may be at least one electromagnet. In some embodiments, at least one magnet 175, at least one magnet 321, magnets described and/or noted herein, may be a combination of electromagnets and permanent magnets.

In some embodiments, the magnet(s) (e.g., magnet(s) 175 and/or magnet(s) 321) discussed herein for repelling sharks may be selected from permanent magnets and/or electromagnets. Note in general the magnet(s) (e.g., magnet(s) 175 and/or magnet(s) 321) discussed herein for repelling sharks may be significantly stronger than a comparably sized magnet that is merely used for a magnet's attractive properties. In some embodiments, magnet(s) 175 and/or magnet(s) 321 may be permanent magnet(s), that may be substantially constructed from at least one rare Earth metal. In some embodiments, magnet(s) 175 and/or magnet(s) 321 may be permanent samarium magnet(s). In some embodiments, magnet(s) 175 and/or magnet(s) 321 may be permanent samarium-cobalt magnet(s). In some embodiments, magnet(s) 175 and/or magnet(s) 321 may be permanent neodymium magnet(s). In some embodiments, magnet(s) 175 and/or magnet(s) 321 may be permanent magnet(s), that may be substantially constructed from at least neodymium, iron, and boron (NdFeB). In some embodiments, magnet(s) 175 and/or magnet(s) 321 may be permanent magnet(s) of a predetermined grade. In some embodiments, magnet(s) 175 and/or magnet(s) 321 may be permanent magnet(s) of grade N52, N55, combinations thereof, and/or the like. In other embodiments, magnet(s) 175 and/or magnet(s) 321 may be permanent magnet(s) of another grade. In some embodiments, magnet(s) 175 and/or magnet(s) 321 may be sintered and/or bonded. In some embodiments, magnet(s) 175 and/or magnet(s) 321 may be coated with a protective sheath, to minimize corrosion problems.

Note with respect to the materials of construction, it is not desired nor intended to thereby unnecessarily limit the present invention by reason of such disclosure.

Magnetized spearfishing shafts (or portion(s) thereof) and magnetized PFDs (or portion(s) thereof) have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A spearfishing apparatus fitted with at least one magnet that is configured to repel sharks away from the spearfishing apparatus; wherein the spearfishing apparatus comprises a spear shaft and the at least one magnet; wherein the at least one magnet is in physical communication with at least a portion of the spear shaft; wherein the at least one magnet has a comparably stronger magnetic field than a different magnet used for attractive purposes that has a similar size to the at least one magnet.

2. The spearfishing apparatus according to claim 1, wherein the spear shaft is made from aluminum, graphite, carbon fiber, plastic, or combinations thereof.

3. The spearfishing apparatus according to claim 1, wherein the at least one magnet is located at one or more of:
   covering most of the spear shaft;
   covering at least a portion of the spear shaft;
   on the spear shaft;
   attached to the spear shaft;
   within the spear shaft;
   at least partially embedded in the spear shaft;
   on a terminal end of the spear shaft; or
   at a terminal end of the spear shaft.

4. The spearfishing apparatus according to claim 1, wherein the spear shaft comprises the at least one magnet and a shaft core; wherein both the at least one magnet and the shaft core are elongate cylindrical members; wherein the at least one magnet and the shaft core are substantially concentric with respect to each other over a majority of a length of the spear shaft.

5. The spearfishing apparatus according to claim 1, wherein the at least one magnet is substantially an elongate cylindrical member that forms a core of the spear shaft, with the at least one magnet substantially occupying an axial center of the spear shaft.

6. The spearfishing apparatus according to claim 1, wherein the at least one magnet is a plurality of magnets that are dispersed substantially equidistant from each other within the spear shaft.

7. The spearfishing apparatus according to claim 1, wherein the at least one magnet and the spear shaft are both elongate members that are substantially coincident with each other with respect to lengths of the at least one magnet and of the spear shaft.

8. The spearfishing apparatus according to claim 1, wherein the spearfishing apparatus further comprises a spear tip and one or more magnets; wherein the one or more magnets are configured to repel sharks away from the spear tip; wherein the one or more magnets have a comparably stronger magnetic field than the different magnet used for attractive purposes that has a similar size to the one or more magnets; wherein the one or more magnets are located at one or more of:
   covering most of the spear tip;
   on the spear tip;
   attached to the spear tip;
   within the spear tip;
   at least partially embedded in the spear tip;
   on a terminal end of the spear tip; or
   at a terminal end of the spear tip.

9. The spearfishing apparatus according to claim 1, wherein the spearfishing apparatus further comprises a spear gun and one or more magnets; wherein the one or more magnets are configured to repel sharks away from the spear gun; wherein the one or more magnets have a comparably stronger magnetic field than the different magnet used for attractive purposes that has a similar size to the one or more magnets; wherein the one or more magnets are located at one or more of:
   on a stock of the spear gun;
   attached to the stock of the spear gun;
   within the stock of the spear gun;
   at least partially embedded in the stock of the spear gun;
   on a grip of the spear gun;
   attached to the grip of the spear gun;
   within the grip of the spear gun; or
   at least partially embedded in the grip of the spear gun.

10. The spearfishing apparatus according to claim 1, wherein the at least one magnet is an electromagnet; wherein the spearfishing apparatus comprises at least one battery configured to provide electrical power to the electromagnet; wherein the electromagnet and the at least one battery are operatively linked with each other.

* * * * *